United States Patent [19]

Raj

[11] 4,357,024
[45] Nov. 2, 1982

[54] FERROFLUID ROTARY-SHAFT SEAL APPARATUS AND METHOD

[75] Inventor: Kuldip Raj, Merrimack, N.H.

[73] Assignee: Ferrofluidics Corporation, Nashua, N.H.

[21] Appl. No.: 208,290

[22] Filed: Nov. 19, 1980

[51] Int. Cl.³ .............................................. F16J 15/40
[52] U.S. Cl. ......................................... 277/1; 277/80; 277/135
[58] Field of Search ............... 277/1, 80, 135, DIG. 7; 308/10, 36.1, 187.1, 187.2

[56] References Cited

FOREIGN PATENT DOCUMENTS

| | | | |
|---|---|---|---|
| 267656 | 11/1963 | Australia | 277/80 |
| 959073 | 5/1964 | United Kingdom. | |
| 1292338 | 10/1972 | United Kingdom. | |
| 1575145 | 9/1980 | United Kingdom. | |
| 420836 | 8/1974 | U.S.S.R. | 277/80 |
| 742657 | 6/1980 | U.S.S.R. | 277/80 |
| 765579 | 9/1980 | U.S.S.R. | 277/80 |

OTHER PUBLICATIONS

*Machine Design*, issue of Mar. 28, 1968, "Magnetic-Fluid Seals," Rosenzweig et al., pp. 145–149.
*Cryogenics*, issue of Jun. 1979, "Application of Magnetofluid Seals for High-Speed Rotating Cryostats," M. O. Lutset et al., pp. 333 and 334.

*Primary Examiner*—Robert S. Ward, Jr.
*Attorney, Agent, or Firm*—Richard P. Crowley

[57] ABSTRACT

A ferrofluid rotary-shaft seal apparatus of extended seal life particularly adapted for use as an exclusion seal with a computer-disc-drive spindle, which seal apparatus comprises: an annular permanent magnet; first and second pole pieces, one end of each pole piece extending into a close, noncontacting relationship with the surface of the shaft, to form a gap width between the one end of the pole piece and the surface of the shaft; and ferrofluid in the gap widths to form a ferrofluid O-ring seal, whereby, in operation, the ferrofluid, under the thinner pole piece, evaporates and forms an air gap, while the ferrofluid at the wider gap width provides extended seal life.

18 Claims, 1 Drawing Figure

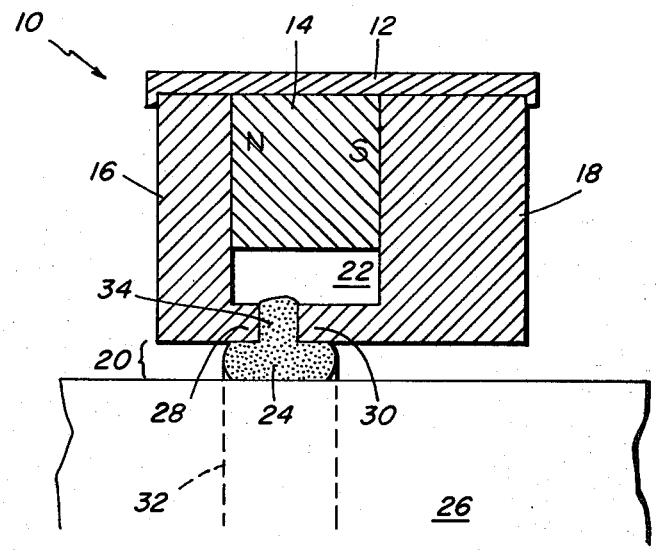

FERROFLUID ROTARY-SHAFT SEAL APPARATUS AND METHOD

BACKGROUND OF THE INVENTION

Ferrofluid-type seal apparatuses for use in sealing rotary shafts, with single- and multiple-stage, ferrofluid-liquid, O-ring seals about the shaft, are well known (see, for example, U.S. Pat. No. 3,620,584 which describes a multiple-stage, ferrofluid, rotary-shaft seal).

Single- and multiple-stage ferrofluid seals have been used as exclusion seals, to protect one environment on one side of the shaft from contaminants in an environment on the other side of the shaft. Ferrofluid-type exclusion seals are useful particularly with computer-disc-drive spindles, to prevent contaminants in an environment from reaching a memory-disc area.

One standard ferrofluid exclusion seal presently employed in the computer field comprises an annular, ring-like, permanent magnet adapted to surround the spindle shaft and sandwiched between two, identical, pole-piece elements which are placed at the outer diameter into a contacting, magnetic-flux relationship with the one and the other polar ends of the permanent magnet. The inner diameter of the pole-piece elements extends into a close, noncontacting relationship with the surface of the shaft or spindle, to form a small gap for example, 2 to 10 mils, between the inner diameter of the pole piece elements and the shaft surface. A ferrofluid is disposed and magnetically retained in the gaps on the insertion of the magnetically permeable shaft or spindle, to form one or more liquid O-ring stages, which serve to form a ferrofluid exclusion seal about the shaft.

A wide variety of magnetic materials may be used to provide the permanent magnet, but usually the material is a sintered or bonded ceramic material having a thickness of about 80 to 150 mils. The pole-piece elements are composed of magnetically permeable material, such as magnetic stainless steel (for example, 400 series), and range in thickness from about 25 to 80 mils. The standard exclusion seal, depending on customer requirements, is provided as described or placed in a nonmagnetic housing, such as of aluminum or stainless steel (for example, 300 series), such as by bonding- or staking-assembly techniques.

The exclusion seal is formed by placing a precise, optimum amount of a ferrofluid in the annular gap regions between the inner diameter of the pole pieces and the spindle shaft. Typically, the ferrofluid comprises a low-vapor-pressure carrier liquid, such as a fluorocarbon, a polyphenylether, a hydrocarbon, a diester liquid and similar low-vapor-pressure liquids, to provide for a very low mass loss of the ferrofluid forming the O-ring seal, thereby providing an exclusion seal of long operating life. For example, the standard ferrofluid exclusion seal is expected generally to last for several years under moderate temperature conditions with the currently used computer-disc-drive-spindle speeds of 3600 rpm and with shaft diameters up to about 1.8 inches. The ferrofluid used may vary in viscosity, and the saturation magnetization, which usually ranges from 20 to 500 cps, and 100 to 400 gauss respectively.

It is desirable to extend the useful operating life of ferrofluid exclusion seals, particularly under higher ambient-temperature conditions; for example, greater than 50° C., at spindle speeds that exceed 3600 rpm, and for larger shaft diameters, or a combination of these conditions.

SUMMARY OF THE INVENTION

The invention relates to a ferrofluid-type, rotary-shaft seal having an extended life and to the method of manufacturing and using such seal apparatus. In particular, the invention concerns a ferrofluid exclusion seal particularly useful with and in sealing computer-disc-drive spindles for extended time periods.

In a standard ferrofluid exclusion seal, it has been found that there are two basic design considerations—one magnetic, which determines the seal pressure, and the other heat-generation, which determines the seal life span.

Generally, the total pressure capacity of the current ferrofluid exclusion seals ranges from about 30 to 60 inches of water divided approximately equally between the two pole pieces. The pressure requirement for the usual disc-drive application is only 5 inches of water; thus, the seals have a large safety margin when it comes to pressure. In fact, even one ferrofluid O-ring seal is more than adequate to yield the required pressure capacity; however, in the present, standard design, there are two pole pieces, so that the magnetic-flux circuit will be complete.

It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal. The operating fluid temperature is higher, when ferrofluid fills both gap regions, than when only one stage is activated with ferrofluid, and the other stage has an air gap under it. This results because each gap region filled with ferrofluid serves as an independent source of heat, thus raising the temperature of the seal structure to a higher value than if just one stage has been activated with ferrofluid.

Hence, unlike the seal pressure which doubles for both stages activated, as opposed to just one, seal life increases by having only one gap region filled with ferrofluid, and not both or a plurality of gap regions. Thus, an ideal situation would be one in which only one pole piece is activated with ferrofluid. A second pole piece, which would operate with an air gap, is used only to complete the magnetic circuit. The air gap aids in permitting the movement of air from the cavity between the pole pieces. The present seal-installation techniques, however, prohibit achieving this goal, since the ferrofluid is injected into the magnet area, which results in ferrofluid migration into both gap regions, upon the spindle shaft insertion.

It has been discovered that the seal life of a ferrofluid rotary-seal apparatus may be extended through the use of a single-stage ferrofluid seal. A single-stage seal comprises two pole pieces so designed and arranged that there is one common ferrofluid gap width under the inner diameter of the pole pieces, to form a single, ferrofluid, O-ring seal about the surface of the shaft to be sealed. The single-stage seal would have an extended seal life, because of only one ferrofluid stage, and would not as a standard seal present a stage of the same gap width under each pole piece.

A single-stage seal comprises two pole pieces having a generally L-shaped, cross-sectional area. The inner diameter of the pole pieces is spaced in a close, but noncontacting, relationship to the surface of the shaft, to form a gap therebetween, typically 2 to 6 mils, or a great gap width; for example, 12 to 24 mils or more, as described in the copending patent application Ser. No. 208,438 filed on the same day as this patent application and hereby incorporated by reference. The radial gap between the inner diameter of the pole pieces and the shaft surface may vary as desired, but should be sufficiently small, to concentrate the magnetic flux in the gap between the inner diameter of the pole pieces and the shaft surface, typically about 2 to 10 mils; for example, 6 to 8 mils.

The design of the L-shaped pole pieces provides for magnetic flux in the pole-piece interstage region, to form a single ferrofluid seal. The ferrofluid, when injected into the seal apparatus, will concentrate at the interstage gap and will be held in place in the gap, prior to the insertion of the magnetically permeable shaft. When the shaft is inserted into the ferrofluid-containing seal apparatus, the magnetic-flux path is changed, and much of the magnetic flux is diverted into the radial-gap region beneath the ends of the pole pieces, due to the formation of a lower reluctance path for the magnetic flux. The ferrofluid then forms, on rotation of the shaft, a single, ferrofluid, O-ring seal on the shaft surface. The O-ring seal is formed by the ferrofluid between the interstage region and the pole pieces and the shaft.

The single-stage seal permits longer seal life, since heat is generated only by one ferrofluid O-ring seal, but carried away by the pole pieces for optimim seal life. It has been found that a single-stage seal provides a seal life of three to four times longer than a standard two-stage seal with the same radial gap. Two distinct seal-failure modes have been observed with the single-stage seal. It is believed that the failure modes are due to the breaking up of the original, single-stage ferrofluid seal into two, distinct, O-ring seals under the one end of each pole piece, when the volume of the ferrofluid of the single-stage seal has been reduced by evaporation. The rapid evaporation of the two, smaller, O-ring seals follows and results in complete seal failure.

The invention will be described for the purpose of illustration only in connection with a particularly preferred embodiment; however, it is recognized that those persons skilled in the art may make various changes and modifications to the described embodiment, without departing from the spirit and scope of the invention.

BRIEF DESCRIPTION OF THE DRAWING

The drawing is a schematic, illustrative, cross-sectional view of a ferrofluid exclusion seal of the invention at the start of operation.

DESCRIPTION OF THE EMBODIMENTS

The drawing shows an extended-life, single-stage, ferrofluid exclusion seal apparatus 10 which comprises a permanent magnet ring 14 having opposite poles on either side, the magnet within a nonmagnetic housing 12, such as of aluminum or stainless steel, and having magnetically permeable pole pieces 16 and 18 sandwiched in contact with either side of the magnet 14, to form a small cavity 22 therebetween. The magnet 14 and the pole pieces 16 and 18 in housing 12 are disposed about a magnetically permeable shaft 26, such as a computer-disc-drive spindle. The pole pieces 16 and 18 shown as of nonidentical width, but which may be of identical width; for example, 25 to 40 mils, but 40 to 70 mils at the one end, are generally L-shaped in cross-sectional configuration, to form at the one end of each pole piece a defined, radial-gap width 20, for example, of 2 to 10 mils, between the one end of the pole piece and the surface of the shaft 26, while the inwardly projecting ends of the pole pieces 28 and 30 form a defined, interstage gap 34 between the inner diameter of the end; for example, 10 to 25 mils; for example, 15 to 20 mils.

As illustrated, ferrofluid 24, such as a diester ferrofluid of 50 to 500 cps viscosity and a magnetic saturation of 100 to 450 gauss, is retained within the interstage region 34 and the radial gap 20 under the one end of both pole pieces 16 and 18 by magnetic flux, to form a single, O-ring, ferrofluid seal 32, shown in parallel dotted lines, about the shaft surface, on rotation of the shaft. The single-stage seal 10 provides for an extended seal life.

Experiments, comparing a standard, two-stage, exclusion seal, with identical, rectangular pole pieces of 40 mils in width, and a single stage exclusion seal of the invention, with pole pieces of the same width, but L-shaped, and 60 mils at the one end, were conducted. The tests were conducted with a diester-based ferrofluid of 50 cps viscosity and a 200-gauss saturation magnetization, with a 6-mil radial gap and a 20-mil interstage gap at 100° C., employing a 1.8-inch-diameter, computer-disc-drive spindle at 3600 rpm. The test data showed failure of the standard seal at 180 hours, while the single-stage seal did not fail totally until 760 hours; thus demonstrating the extended seal life of the single-stage seal.

What is claimed is:

1. A ferrofluid-seal rotary-shaft system having an extended ferrofluid-seal life, which system comprises in combination:
    (a) a magnetically permeable, rotary-shaft element; and
    (b) a single-stage ferrofluid rotary-seal apparatus which comprises
        (i) an annular permanent magnet surrounding the shaft element and having poles of opposite polarity,
        (ii) first and second annular, magnetically permeable, pole-piece elements, the pole-piece elements at the one end in a magnetic fluid relationship with the permanent magnet, to form a closed, magnetic flux loop between the permanent magnet, the pole pieces and the shaft element, with the other end of the first and second pole pieces extending into a close, annular, noncontacting relationship with the shaft element, to form a radial gap between the other end of the first and second pole-piece elements and the surface of the shaft element,
        (iii) the first and second pole pieces further characterized by a generally L-shaped, sectional configuration, with a projection from the other end of the first and second pole pieces, the projection of the first and second pole pieces extending toward each other, to form an interstage gap therebetween,
        (iv) the first and second pole pieces further defining a ring-like air cavity between the first and second L-shaped pole pieces, the ring-like air cavity extending about the shaft element, and (v) a defined quantity of ferrofluid disposed and retained by magnetic flux both in the interstage gap and the adjacent radial gaps at the other end of the pole pieces, to form a single-stage, O-ring ferrofluidic seal about the shaft element, with the cavity substantially free of excess ferrofluid, whereby during operation the seal apparatus will operate sequentially as a single-stage seal, a two-O-ring seal under each radial gap, and a single-stage seal under one radial gap before seal failure, thereby providing a ferrofluid-seal-shaft system having an extended ferrofluid-seal life.

2. The system of claim 1 wherein the radial gap ranges from about 2 to 10 mils in width.

3. The system of claim 1 wherein the interstage gap ranges from about 10 to 30 mils in width.

4. The system of claim 1 wherein the first and second pole pieces are of unequal width.

5. The system of claim 1 wherein the shaft element comprises a computer-disc-drive-spindle shaft element.

6. The system of claim 1 wherein the ferrofluid comprises a low-vapor-pressure carrier liquid.

7. The system of claim 1 wherein the ferrofluid has a viscosity of from about 20 to 500 cps and a saturation magnetization of from about 100 to 450 gauss.

8. The system of claim 1 wherein the ferrofluid in the radial and interstage gaps forms initially in cross-section a generally T-shaped, single-stage, ferrofluid seal.

9. The system of claim 1 wherein the other ends of the first and second pole pieces are essentially flat surfaces, and the ends of the projections are essentially flat, generally parallel surfaces.

10. A ferrofluid-seal rotary-shaft system having an extended ferrofluid-seal life, which system comprises in combination:
(a) a magnetically permeable, computer-disc-drive-spindle, rotary-shaft element; and
(b) a single-stage ferrofluid rotary-seal apparatus which comprises
(i) an annular permanent magnet surrounding the shaft element and having poles of opposite polarity,
(ii) first and second annular, magnetically permeable, pole-piece elements, the pole-piece elements at the one end in a magnetic flux relationship with the permanent magnet, to form a closed, magnetic flux loop between the permanent magnet, the pole pieces and the shaft element, with the other end of the first and second pole pieces being an essentially flat surface and extending into a close, annular, noncontacting relationship with the shaft element, to form a radial gap between the other end of the first and second pole-piece elements and the surface of the shaft element,
(iii) the first and second pole pieces further characterized by a generally L-shaped, sectional configuration, with a projection from the other end of the first and second pole pieces, the end of the projection being essentially a flat, generally parallel surface, the projection of the first and second pole pieces extending toward each other, to form an interstage gap therebetween,
(iv) the first and second pole pieces further defining a ring-like air cavity between the first and second L-shaped pole pieces, the ring-like air cavity extending about the shaft element, and (v) a defined quantity of ferrofluid disposed and retained by magnetic flux both in the interstage gap and the adjacent radial gaps at the other end of the pole pieces, to form a single-stage, O-ring ferrofluidic seal about the shaft element, with the cavity substantially free of excess ferrofluid, whereby during operation the seal apparatus will operate sequentially as a single-stage seal, a two-O-ring seal under each radial gap, and a single-stage seal under one radial gap before seal failure, thereby providing a ferrofluid-seal-shaft system having an extended ferrofluid-seal life.

11. In a method for extending the ferrofluid-seal life of a ferrofluid-seal rotary-shaft system for sealing a magnetically permeable, rotary-shaft element, which method comprises:
(a) surrounding the rotary-shaft element with an annular permanent magnet and having poles of opposite polarity at each end;
(b) surrounding the rotary shaft with first and second magnetically permeable pole-piece elements having a one end and another end, the one end of the pole-piece elements in a magnetic flux relationship to the one and other ends of the permanent magnet;
(c) extending the other end of each of the pole-piece elements into a close, noncontacting relationship with the surface of the rotary-shaft element, to form first and second radial gaps therebetween of defined width; and
(d) retaining magnetically in the first and second gaps a ferrofluid, to form at least two liquid O-ring seals on the surface of the rotary-shaft element, the improvement which comprises
(i) providing first and second pole pieces having projections at each end extending generally axially to the rotary-shaft element, the projections extending toward each other, to form an interstage gap therebetween, the pole pieces forming a generally empty air cavity therebetween, and
(ii) retaining magnetically, in both the interstage gap and the adjacent radial gaps, a sealing amount of a ferrofluid, to form a single-stage, O-ring seal about the surface of the shaft element.

12. The method of claim 11 wherein the ferrofluid seal has a viscosity of from about 50 to 500 cps and a magnetic saturation of from about 100 to 450 gauss.

13. The method of claim 11 which includes employing, as the rotary-shaft element, a computer-disc-drive-spindle shaft element.

14. The method of claim 11 which includes providing first and second pole pieces having a generally L-shaped, cross-sectional configuration, the ends of the projections of each pole piece being flat and parallel to each other to form the interstage gap, and the other ends of the magnetic pole pieces forming the radial gap being generally flat and parallel to the surface of the rotary-shaft element.

15. The method of claim 11 wherein the ferrofluid comprises a low-vapor-pressure carrier liquid, the ferrofluid O-ring seal having a generally T-shaped, cross-sectional form.

16. The method of claim 11 which includes, during rotation of the rotary-shaft element, forming two ferrofluid O-ring seals on evaporation of the ferrofluid from between the interstage gap, to provide separate O-ring ferrofluid seals in the radial gap between the respective first and second pole pieces.

17. The method of claim 11 wherein the radial gap ranges from about 2 to 24 mils and the interstage gap ranges from about 10 to 30 mils in width.

18. In a method for extending the ferrofluid-seal life of a ferrofluid-seal rotary-shaft system for sealing a magnetically permeable, rotary-shaft element, which method comprises:

(a) surrounding the rotary-shaft element with an annular permanent magnet and having poles of opposite polarity at each end;

(b) surrounding the rotary shaft with first and second magnetically permeable pole-piece elements having a one end and another end, the one end of the pole-piece elements in a magnetic flux relationship to the one and other ends of the permanent magnet;

(c) extending the other end of each of the pole-piece elements into a close, noncontacting relationship with the surface of the rotary-shaft element, to form first and second radial gaps therebetween of defined width; and (d) retaining magnetically in the first and second gaps a ferrofluid, to form at least two liquid O-ring seals on the surface of the rotary-shaft element, the improvement which comprises (i) providing first and second pole pieces having a generally L-shaped, cross-sectional configuration and having projections at each end extending generally axially to the rotary-shaft element, the projections extending toward each other and the ends of the projections of each pole piece being flat and parallel to each other, to form an interstage gap therebetween which ranges from 10 to 30 mils, the other end of the magnetic pole pieces forming the radial gap being generally flat and parallel to the surface of the rotary-shaft element, the pole pieces forming a generally empty air cavity therebetween, and (ii) retaining magnetically, in both the interstage gap and the adjacent radial gaps, a sealing amount of a ferrofluid, to form a single-stage, O-ring seal about the surface of the shaft element.

* * * * *